United States Patent
Hui et al.

(10) Patent No.: US 9,510,362 B2
(45) Date of Patent: *Nov. 29, 2016

(54) OVERLAYING RECEIVE SCHEDULES FOR ENERGY-CONSTRAINED DEVICES IN CHANNEL-HOPPING NETWORKS

(71) Applicant: Cisco Technology, Inc., San Jose, CA (US)

(72) Inventors: Jonathan W. Hui, Belmont, CA (US); Wei Hong, Berkeley, CA (US); Jean-Philippe Vasseur, Anchorage, AK (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/969,477

(22) Filed: Dec. 15, 2015

(65) Prior Publication Data

US 2016/0105906 A1  Apr. 14, 2016

Related U.S. Application Data

(63) Continuation of application No. 13/921,680, filed on Jun. 19, 2013, now Pat. No. 9,246,845.

(51) Int. Cl.
| | |
|---|---|
| *H04W 72/12* | (2009.01) |
| *H04B 1/713* | (2011.01) |
| *H04L 12/911* | (2013.01) |
| *H04W 4/00* | (2009.01) |
| *H04B 1/7156* | (2011.01) |
| *H04W 72/04* | (2009.01) |

(Continued)

(52) U.S. Cl.
CPC ......... *H04W 72/1263* (2013.01); *H04B 1/713* (2013.01); *H04B 1/7156* (2013.01); *H04L 47/826* (2013.01); *H04L 67/325* (2013.01); *H04W 4/005* (2013.01); *H04W 72/0446* (2013.01); *H04L 67/12* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 2004/0083833 | A1* | 5/2004 | Hitt | A01G 25/167 73/866 |
| 2007/0165593 | A1* | 7/2007 | Hundal | H04L 1/0072 370/349 |

(Continued)

FOREIGN PATENT DOCUMENTS

| | | |
|---|---|---|
| WO | 2006/130662 A2 | 12/2006 |
| WO | 2008/069532 A1 | 6/2008 |
| WO | 2013/016204 A1 | 1/2013 |

OTHER PUBLICATIONS

International Search Report dated Oct. 7, 2014 in connection with corresponding International Application No. PCT/US2014/043290.

*Primary Examiner* — Kodzovi Acolatse
(74) *Attorney, Agent, or Firm* — Parker Ibrahim & Berg LLC; James M. Behmke; Stephen D. LeBarron

(57) ABSTRACT

In one embodiment, a time at which a first device in a frequency-hopping communication network is expected to transmit a data message is determined. A first schedule is then generated based on the determined time, and the first schedule is overlaid on a frequency-hopping schedule for a second device in the network. The first schedule defines a first timeslot during which the second device listens for the data message, while the frequency-hopping schedule defines second timeslots during which the second device listens for data messages from other devices in the network. Notably, a duration of the first timeslot is greater than respective durations of the second timeslots.

18 Claims, 6 Drawing Sheets

(51) Int. Cl.
*H04W 84/18* (2009.01)
*H04L 29/08* (2006.01)

(56) References Cited

U.S. PATENT DOCUMENTS

| | | | |
|---|---|---|---|
| 2008/0084852 A1* | 4/2008 | Karschnia | H04B 7/2656 370/337 |
| 2011/0075704 A1* | 3/2011 | Bettendorff | H04B 1/713 375/133 |
| 2012/0155511 A1 | 6/2012 | Shaffer et al. | |
| 2013/0013086 A1 | 1/2013 | MacArthur et al. | |
| 2013/0016757 A1* | 1/2013 | Hui | H04B 1/7156 375/134 |
| 2013/0016758 A1 | 1/2013 | Hui et al. | |
| 2013/0022084 A1 | 1/2013 | Vasseur et al. | |
| 2013/0028103 A1 | 1/2013 | Hui et al. | |

* cited by examiner

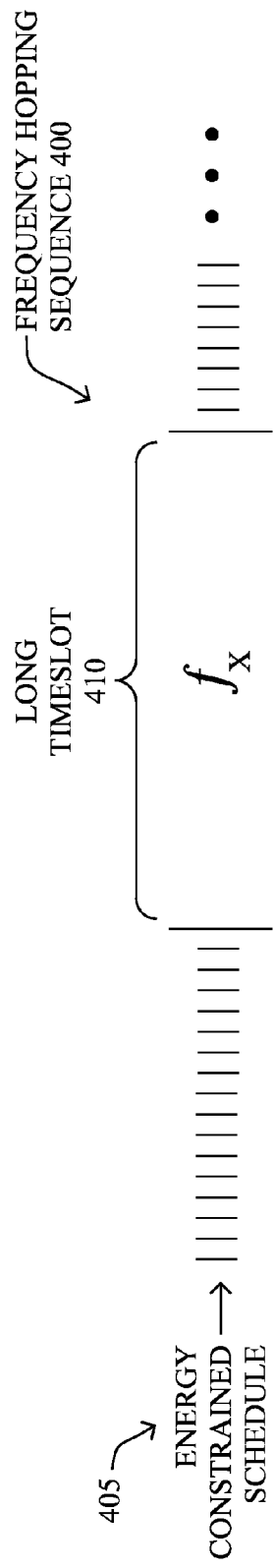
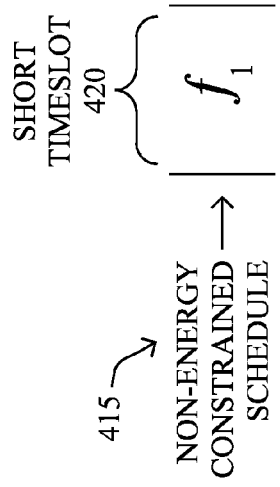
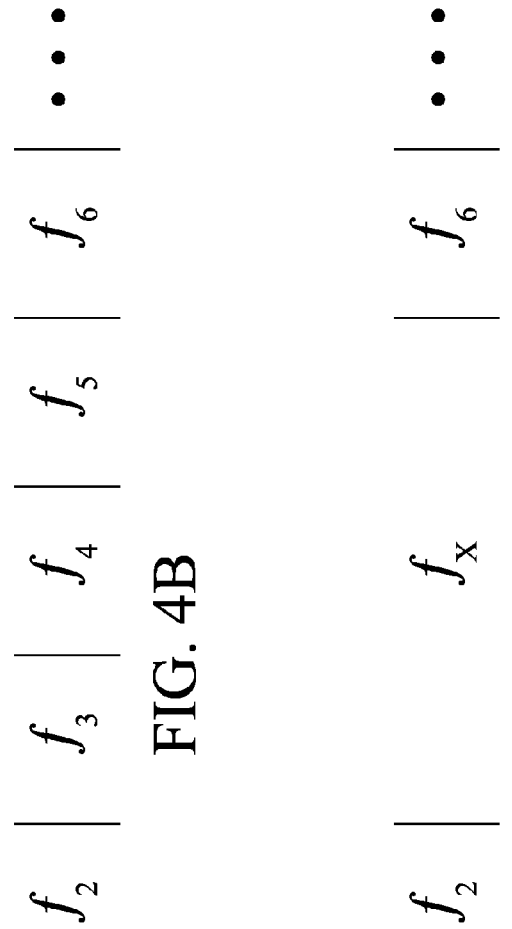
FIG. 4A
FIG. 4B
FIG. 4C

OVERLAYING RECEIVE SCHEDULES FOR ENERGY-CONSTRAINED DEVICES IN CHANNEL-HOPPING NETWORKS

RELATED APPLICATION

The present application is a Continuation application of U.S. patent application Ser. No. 13/921,680, filed Jun. 19, 2013, entitled OVERLAYING RECEIVE SCHEDULES FOR ENERGY-CONSTRAINED DEVICES IN CHANNEL-HOPPING NETWORKS, by Jonathan W. Hui et al., the contents of which is hereby incorporated by reference.

TECHNICAL FIELD

The present disclosure relates generally to computer networks, and, more particularly, to receive schedules in frequency-hopping networks.

BACKGROUND

Low power and Lossy Networks (LLNs), e.g., sensor networks, have a myriad of applications, such as Smart Grid Advanced Metering Infrastructure (AMI). In a Smart Grid AMI network, systems can measure, collect, and analyze energy usage by communicating with metering devices such as electricity meters, gas meters, water meters, and the like. Unlike electricity meters, gas and water meters are often not connected to a main power source, thus requiring them to be battery powered. As such, gas and water meters can be considered "energy-constrained" devices, due to the scarcity of available energy resources. Unique challenges arise when dealing with energy-constrained devices, particularly when they are implemented in frequency-hopping networks.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4C illustrate an exemplary frequency-hopping sequence including an energy-constrained device schedule, a non-energy constrained device schedule, and an overlaid schedule;

Figure 1:
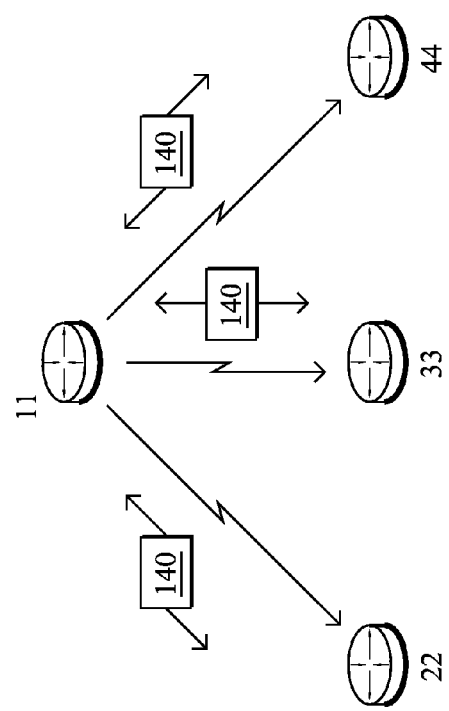
FIG. 1 illustrates an exemplary communication network.
Figure 1:
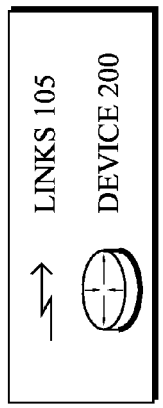

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DESCRIPTION OF EXAMPLE EMBODIMENTS

Overview

According to the disclosed embodiments, a time at which a first device in a frequency-hopping communication network is expected to transmit a data message is determined. A first schedule is then generated based on the determined time, and the first schedule is overlaid on a frequency-hopping schedule for a second device in the network. The first schedule defines a first timeslot during which the second device listens for the data message, while the frequency-hopping schedule defines second timeslots during which the second device listens for data messages from other devices in the network. Notably, a duration of the first timeslot is greater than respective durations of the second timeslots.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communication links located in the same general physical location, such as a building or campus. WANs, on the other hand, typically connect geographically dispersed nodes over long-distance communication links, such as common carrier telephone lines, optical lightpaths, synchronous optical networks (SONET), synchronous digital hierarchy (SDH) links, or power-line communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example (and vastly simplified) computer network 100 (e.g., wireless or otherwise) illustratively comprising nodes/devices 200 (e.g., labeled as shown, "11," "22," "33," and "44") interconnected by frequency-hopping communication links 105, as described below. For the purposes of the present disclosure, the terms "node" and "device" may be applied interchangeably. In particular, certain nodes 200, such as, e.g., sensors, routers, computers, radios, etc., may be in communication with other nodes 200, e.g., based on distance, signal strength, current operational status, location, etc. In an illustrative Smart Grid AMI network, the nodes 200 may include various sensors, such as electricity meters, gas meters, heat meters, water meters, etc.

Those skilled in the art will understand that any number of nodes, devices, links, etc. may be used in the wireless network, and that the view shown herein is for simplicity (particularly, that while sensors are shown, any wireless communication devices 11-44 may be utilized). Also, while the embodiments are illustratively shown herein with reference to a generally wireless network, the description herein is not so limited, and may be applied to networks that have wired links, wireless links, PLC links, etc. Moreover, while the network is shown in a certain orientation, the network 100 is merely an example illustration that is not meant to limit the disclosure.

Data transmissions 140 (e.g., traffic, packets, messages, etc. sent between the devices/nodes) may be exchanged among the nodes/devices of the computer network 100 using predefined network communication protocols such as certain known wireless protocols (e.g., IEEE Std. 802.15.4, WiFi, Bluetooth®, etc.) or other shared media protocols where appropriate (e.g., PLC). As described herein, the communication may be based on a frequency-hopping protocol. In this context, a protocol consists of a set of rules defining how the nodes interact with each other.

Figure 2:
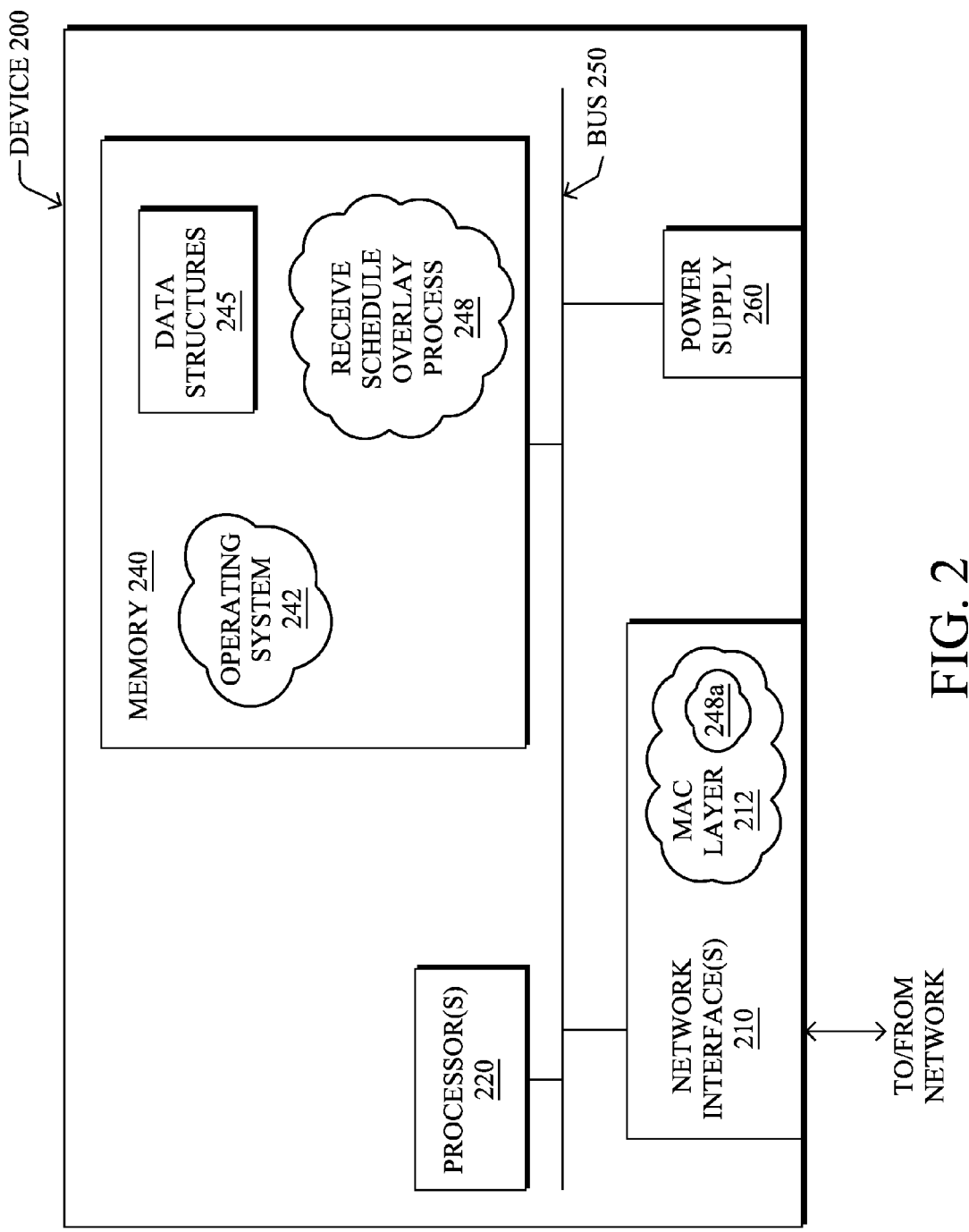
FIG. 2 illustrates an exemplary network device/node.

FIG. 2 is a schematic block diagram of an example node/device 200 that may be used with one or more embodiments described herein, e.g., as shown in FIG. 1. The device may comprise one or more network interfaces 210 (e.g., wireless/channel-hopping), at least one processor 220, a memory 240, as well as a power supply 260 (e.g., plug-in, battery, etc.), all of which may be interconnected by a system bus 250.

The network interface(s) 210, e.g., transceivers, contain the mechanical, electrical, and signaling circuitry for communicating data over wireless links 105 coupled to the network 100. The network interfaces may be configured to transmit and/or receive data using a variety of different communication protocols as noted above and as will be understood by those skilled in the art. The device 200 may have multiple different types of network interfaces 210, e.g., wireless and wired/physical connections, and that the view herein is merely for illustration. Also, while the network interface 210 is shown separately from power supply 260, in the case of PLC, for example, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor(s) 220 and the network interface(s) 210 for storing software programs and data structures associated with the embodiments described herein. Note that certain devices may have limited memory or no memory (e.g., no memory for storage other than for programs/processes operating on the device). The processor(s) 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise an illustrative "receive schedule overlay" process 248, as described herein. Note that while the receive schedule overlay process 248 is shown in centralized memory 240, alternative embodiments provide for the process, or portions thereof, to be specifically operated within the network interfaces 210, such as a component of a MAC layer 212 (process "248a"). It should be understand that myriad additional processes/applications may be stored within memory 240 as well, including, for example, routing process/services, a directed acyclic graph (DAG) formation process, etc.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which the routers, or more generally, the devices, have access to reduced resources, e.g., processing power, memory, and/or energy (battery). Also, their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

In many cases, LLN devices communicate using a frequency-hopping, or channel-hopping, link layer. This approach may be driven both by regulatory compliance and the fact that channel-hopping systems offer better spectral efficiency. Frequency-hopping, also referred to as "frequency-hopping spread spectrum" (FHSS), is a method of transmitting radio signals by rapidly switching a carrier among numerous frequency channels, e.g., using a pseudo-random sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

Figure 3:
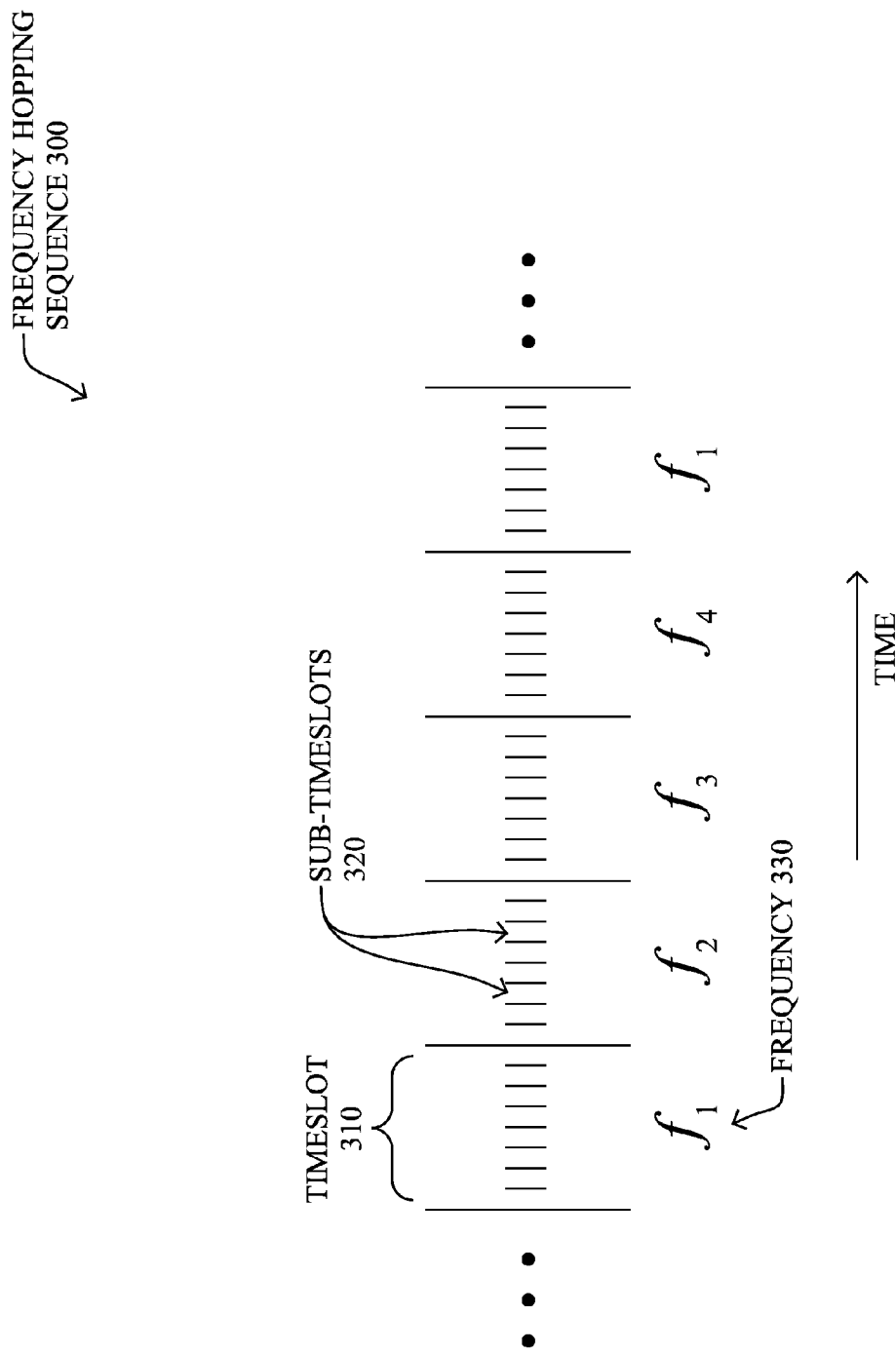
FIG. 3 illustrates an exemplary frequency-hopping sequence.

In general, as shown in FIG. 3, in frequency-hopping wireless networks, time frames are divided within a frequency-hopping sequence 300 into regular timeslots 310, each one operating on a different frequency 330 (e.g., $f_1$-$f_4$). A reference clock may be provided for the time frames for an entire network (e.g., mesh/cell), or at least between pairs of communicating devices. A MAC layer 212 of each node 200 divides time into timeslots that are aligned with the timeslot boundary of its neighbor. Also, each timeslot 310 may be further divided into sub-timeslots 320. (Note that not all frequency-hopping systems use sub-timeslots, and devices can begin transmission at any time within a timeslot; the view herein is merely one example.) Illustratively, the MAC layer 212 is in charge of scheduling the timeslot in which a packet is sent, the main objective of which generally being randomization of the transmission time in order to avoid collisions with neighbors' packets. Note that the MAC layer 212 must not only schedule the data messages coming from upper layers of a protocol stack, but it also must schedule its own packets (e.g., acknowledgements, requests, beacons, etc.).

A device in the frequency-hopping network configures its receiver to follow a hopping schedule by picking a channel/frequency sequence, duration of each timeslot, and time base that defines when the first slot in the schedule begins. To then communicate a packet, the transmitter and receiver must be configured to the same channel/frequency during the packet transmission, i.e., synchronized. All devices in a given network may utilize the same hopping schedule (i.e. all devices are configured to use the same channel sequence, time slot duration, and a common time base), resulting in a network where all communication in the network at any given point in time utilizes the same channel. Alternatively, each transmitter-receiver pair may utilize different hopping schedules (i.e., each pair may differ in channel sequence, time slot duration, and/or time base), such that transmitter-receiver pairs may communicate at the same time but on different channels. The latter approach may be preferable as it can add to the overall robustness and versatility of the communication network.

A primary challenge in frequency-hopping systems is maintaining synchronization between transmitter-receiver pairs. Prior to transmitting, a device must know which channel the receiving device is listening to at the time of transmission. Devices can synchronize with each other by exchanging messages with schedule information. Immediately after exchanging information, devices are synchronized to within tens or hundreds of microseconds, such that there is little to no synchronization error. Other techniques for performing pair-wise relative time synchronization for unicast transmissions are also suitable. Over time, however, the synchronization error increases due to oscillator frequency inaccuracies which cause clock drift.

To minimize the error amount, existing systems often require devices to periodically exchange messages to maintain synchronization. For example, one method may require a device to periodically ping neighboring meters to maintain synchronization. Another method may require the device to use sampled-listening, i.e., as described in IEEE 802.15.4 (CSL), where devices periodically probe for packet transmissions.

Problematically, maintaining synchronization using the above methodologies can be costly in terms of power consumption. For example, simply sending and receiving a 100-byte packet at 75 kbps every 10 minutes results in an average current draw of about 15 uA. Additional energy resources can be expended due to retransmissions, maintaining multiple parents, and searching for new parents when pings fail. While this may not be an issue for network devices connected to a main power source, "energy-constrained" devices (e.g., battery operated, solar powered, etc.) cannot afford to resynchronize on a recurring basis.

As noted above, in a Smart Grid AMI network, gas meters and water meters are conventional examples of energy-constrained devices. Unlike electric meters, for example, such devices are often battery-powered with limited energy capacity. As a result, gas and water meters are limited in available energy resources, thereby placing significant constraints on communication, computation, and memory capabilities. Since transmitting messages consumes precious energy resources, typical Smart Grid AMI architecture limits gas and water meters to "edge device" functionality which does not involve routing or forwarding packets generated by other devices.

An existing alternative to the methods above involves increasing the size of the timeslot 310, i.e., the duration during which a first device listens for data transmission(s) from a second device on a particular frequency 330, as shown in FIG. 3. This way, there greater capacity for accommodating the large synchronization error of the energy-constrained devices. However, doing so would require increasing the timeslots by 1-2 orders of magnitude, which reduces the network's overall robustness to interference and channel diversity. Therefore, there is a currently a need for a frequency-hopping scheme which supports energy-constrained devices, without sacrificing the overall communication quality of non-energy-constrained devices.

Overlaying Receive Schedules in Frequency-Hopping Networks

The techniques herein support energy-constrained devices that cannot maintain the same synchronization error as mains-powered devices e.g., non-energy-constrained devices. The disclosed embodiments include scheduling occasional "long timeslots" that overlay the existing short timeslot schedule. The long timeslot accounts for the larger synchronization error expected by energy-constrained devices, while the short timeslots maintain interference robustness and channel diversity for the vast majority of traffic within the network, e.g., LLN. The long timeslots may be explicitly scheduled by the energy-constrained device, mains-powered device, or negotiated between the two. The long timeslots may be dynamically sized based on the observed synchronization error. The mains-powered device may propagate the long timeslot schedule to neighboring devices to maintain connectivity during a long timeslot. Neighboring devices may continue or stop transmitting packets based on the long timeslot schedule. A central device, e.g., NMS, FAR, etc., may be used to select the main-powered device(s) which should implement the long timeslot schedule.

Specifically, according to one or more embodiments of the disclosure as described in detail below, a time at which a first device in a frequency-hopping communication network is expected to transmit a data message is determined. A first schedule is then generated based on the determined time, and the first schedule is overlaid on a frequency-hopping schedule for a second device in the network. The first schedule defines a first timeslot during which the second device listens for the data message, while the frequency-hopping schedule defines second timeslots during which the second device listens for data messages from other devices in the network. Notably, a duration of the first timeslot is greater than respective durations of the second timeslots.

Illustratively, the techniques described herein may be performed by hardware, software, and/or firmware, such as in accordance with the "receive schedule overlay" process 248, which may contain computer executable instructions executed by the processor(s) 220 (or an independent processor of network interface(s) 210) to perform functions relating to the techniques described herein. Generally, the techniques described herein may be processed by similar components that are understood in the art to be operable to overlay receive/listening schedules.

Operationally, the techniques herein generally relate to, but are not limited to, scheduling an occasional long timeslot that overlays an existing short timeslot schedule, and in particular, supporting a frequency-hopping schedule that permits a relatively large synchronization error margin for energy-constrained devices which cannot afford to resynchronize often. The disclosed embodiments allow a pair of devices to schedule long timeslots when an energy-constrained device is expected to communicate, thus allowing for larger synchronization errors when communicating with such devices. The duration of the long timeslots may depend on the capabilities of a particular energy-constrained device. Importantly, the robustness and versatility of the communication network may be preserved since the disclosed embodiments allow regular short timeslot sizes for communication between non-energy-constrained devices, which are capable of frequent resynchronizations, and occasional long timeslot sizes specifically for communication with energy-constrained devices.

FIGS. 4A-4C illustrate an exemplary frequency-hopping sequence including an energy-constrained device schedule, a non-energy constrained device schedule, and an overlaid schedule. The functionality of the frequency-hopping sequence 400 is described above with reference to FIG. 3. It should be understood that the configuration of the frequency-hopping sequence 400 simplifies a typical frequency-hopping schedule, and is depicted as such for illustration purposes only.

As shown in FIG. 4A, the frequency-hopping sequence 400 includes an energy-constrained device schedule 405 defining a long timeslot 410. For the purposes of the present disclosure, the energy-constrained device schedule 405 may be referred to as a "first schedule." The energy-constrained device schedule 405 may be a frequency-hopping schedule of an energy-constrained device, e.g., gas meter, water meter, etc. For the purposes of the present disclosure, the energy-constrained device may be referred to as a "first device." The first device, however, may not necessarily be an energy-constrained device, as the techniques described herein with respect to the first device are also applicable to other network devices.

As described above, the limited energy resources available to energy-constrained devices preclude the devices from regularly resynchronizing their frequency-hopping schedule with neighboring devices. Therefore, because the synchronization error of a device grows over time, e.g., due to frequency differences in local oscillators, the synchronization error of an energy-constrained device is often greater than that of a non-energy-constrained device. This occurrence is known in the art as "loose synchronization."

Notably, the limited energy resources not only constrain the amount of control traffic that an energy-constrained device may generate, but also the amount of application traffic. For example, gas and water meters are typically only expected to communicate data once every 8-24 hours. This low-duty cycle makes it feasible for a non-energy-constrained device to occasionally switch into a mode, e.g., adopt a frequency-hopping schedule, that allows an energy-constrained device to communicate more effectively.

Accordingly, the energy-constrained device schedule 405 may define a long timeslot 410. For the purposes of the present disclosure, the long timeslot 410 may be referred to as a "first timeslot." The long timeslot 410 is a timeslot during which the energy-constrained device may be expected to transmit a data message on a given frequency/channel, e.g., $f_x$. Put another way, the long timeslot 410 is a timeslot during which a second device in the network listens for the data message to be transmitted from the energy-constrained device, as described below. The second device may be a non-energy-constrained device, or another energy-constrained device.

In order to generate the energy-constrained device schedule 405, a first step may be to determine a time at which the energy-constrained device is expected to transmit a data message. Based on the determined time, the energy-constrained device schedule 405 may be generated, whereby the long timeslot 410 encompasses the time during which the device is expected to transmit the data message. The duration of the long timeslot 410 may be based on a number of factors, including, but not limited to, an expected synchronization error of the energy-constrained device, and a predetermined maximum amount of retransmissions necessary for the second device to receive the data message, in case data packets are dropped. The predetermined maximum amount of retransmissions may be set to a desired amount, such that a desired amount of retransmissions is not exceeded. Importantly, the energy-constrained device schedule 405 may be generated, and the duration/start time of the long timeslot 410 may be set/adjusted, by the energy-constrained device, a neighboring non-energy-constrained device, or both, as described further below.

The duration of the long timeslot 410 may further be dynamically adjusted based on an observed synchronization error of the energy-constrained device. For example, when an energy-constrained device resynchronizes with the network, the synchronization error that accumulated since the last synchronization event may be computed. If the synchronization error is above a threshold, the long slot size may be increased. If the synchronization error is below a threshold, the long slot size may be decreased. This way, the duration of the long timeslot 410 may be commensurate with the most up-to-date synchronization error of an energy-constrained device.

Although a single long timeslot 410 is scheduled in FIG. 4A, the energy-constrained device schedule 405 may schedule a plurality of long timeslots at a time. In this case, each of the plurality of long timeslots may be consecutively arranged with one another, which may be useful to support channel diversity when retransmitting messages. For example, an energy-constrained device may make only one transmission attempt per long timeslot. The generated energy-constrained device schedule 405 may be accompanied by a parameter which defines the amount of long timeslots. Moreover, the energy-constrained device schedule 405 may repeat after a predetermined period of time. The predetermined period may depend on a transmission schedule of the energy-constrained device.

As shown in FIG. 4B, the frequency-hopping sequence 400 further includes a non-energy-constrained device schedule 415. The non-energy-constrained device schedule 415 may be a typical frequency-hopping schedule of a non-energy-constrained device, or "mains-powered device." A non-energy-constrained device is a device in a frequency-hopping network, e.g., an LLN, which has sufficient available energy resources to resynchronize its frequency schedule with neighboring devices on a regular, and relatively frequent, basis. For example, in existing mesh networks, electric meters may maintain synchronization with neighboring devices, e.g., sensors, routers, etc., to within +−15 ms by exchanging messages every 10 minutes. For the purposes of the present disclosure, the non-energy-constrained device may be referred to as a "second device." The second device, however, may not necessarily be a non-energy-constrained device, as the techniques described herein with respect to the second device are also applicable to other network devices. For example, the second device could alternatively refer to a second energy-constrained device.

The non-energy-constrained device schedule 415 may define multiple "short timeslots" 420. For the purposes of the present disclosure, the short timeslot 420 may be referred to as a "second timeslot." The short timeslot 420 is a timeslot during which the non-energy-constrained device may listen for data messages, or transmit its own data messages, from/to other devices in the network on a particular frequency. As illustrated in FIG. 4B, during the short timeslot 420, the non-energy-constrained device can receive data using frequency $f_1$. Then, during the following timeslot, the non-energy-constrained device can receive data using frequency $f_2$, and so forth. It should be understood that the frequency $f_2$ may be a randomly calculated frequency, and thus may not sequentially follow the frequency $f_1$.

Importantly, the duration of the long timeslot 410 in the energy-constrained schedule 405 is greater than respective durations of the short timeslots 420 in the non-energy-constrained schedule 415, due to the differing synchronization errors of energy-constrained/non-energy-constrained devices. According to typical frequency-hopping schedules, e.g., the non-energy-constrained device schedule 415, each short timeslot may have a substantially equal duration. Often, the short timeslot 420 may be in the magnitude of milliseconds. Conversely, the long timeslot 410, which allows for greater synchronization errors typical of energy-constrained devices, may be in the magnitude of seconds. It should be understood that the long timeslot 410 and short timeslot 420 in FIGS. 4A and 4B are not necessarily drawn to scale and are depicted as such merely for illustration purposes.

As shown in FIG. 4C, the frequency-hopping sequence 400 includes an overlaid schedule 425, in which the energy-constrained device schedule 405 may be overlaid on the non-energy-constrained device schedule 415. As should be understood, the overlaid schedule 425 allows for a non-energy-constrained device to efficiently communicate with both energy-constrained devices, and other non-energy-constrained devices, in a frequency-hopping network.

Effectively, the non-energy-constrained device can adopt a frequency-hopping schedule which includes both short and long timeslots. For instance, a non-energy-constrained device may follow the standard non-energy-constrained device schedule 415 by switching to a new channel/frequency every X ms, i.e., the duration of the short timeslot 420. Then, at a specific time, e.g., when it is expected that an energy-constrained device will transmit a data message, the non-energy-constrained device may switch to the energy-constrained device schedule 405 so as to listen on a given frequency for a relatively long period of time, i.e., long timeslot 410. After the long timeslot 410 expires, the non-energy-constrained device may resume the non-energy-constrained device schedule 415 by initiating the subsequent short timeslot.

The overlaid schedule 425 thus allows a pair of devices to schedule an occasional long timeslot for when the energy-constrained device is expected to communicate, allowing for larger synchronization errors when communicating with such devices. It should be understood that the start and end of the long timeslot may not necessarily align with the short timeslots of the standard frequency-hopping schedule.

Figure 5:
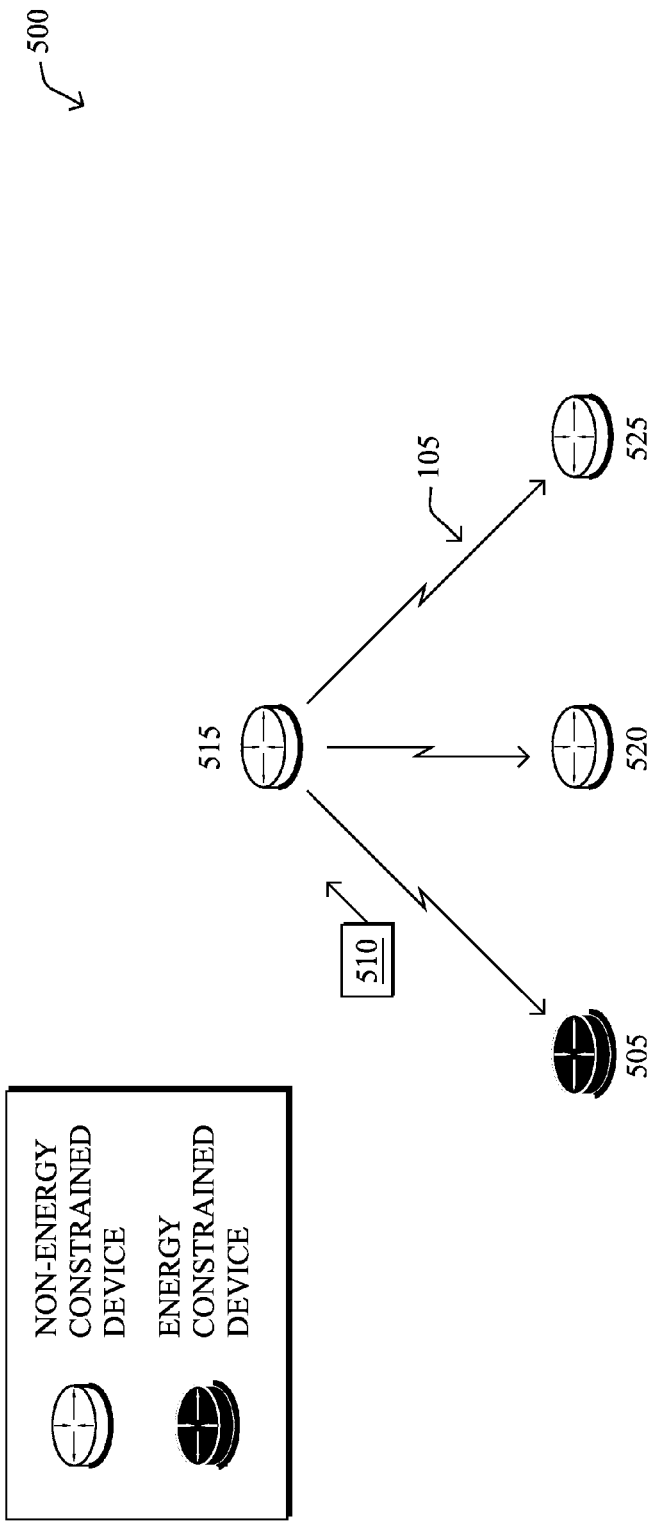
FIG. 5 illustrates an exemplary frequency-hopping communication network including energy-constrained and non-energy-constrained devices.

FIG. 5 illustrates an exemplary frequency-hopping communication network including energy-constrained and non-energy-constrained devices. As shown in FIG. 5, the frequency-hopping network 500 includes an energy-constrained device 505 and non-energy-constrained devices 515, 520 and 525. The frequency-hopping network 500 may be configured in the same manner as described above with respect to the network 100, as illustrated in FIG. 1.

The non-energy-constrained device 515 can receive messages 510 from (and transmit messages to) the neighboring energy-constrained device 505 via a communication link 105. The non-energy-constrained device 515 can similarly communicate with the non-energy devices 520 and 525. Thus, the non-energy-constrained device 515 may adopt an overlaid schedule, as illustrated in FIG. 4C, to efficiently manage communication between the neighboring energy-constrained and non-energy-constrained devices.

In the network 500, only non-energy-constrained device 515 can receive data messages 510 directly from the energy-constrained device 505. However, in a network where multiple non-energy-constrained devices neighbor an energy-constrained device, each neighboring non-energy-constrained device may coordinate the same long timeslot schedule. In other words, each neighboring non-energy-constrained device can listen on the same frequency during the same timeslot. As a result, the energy-constrained device 505 may benefit from receiver diversity on a single transmission. Alternatively, each neighboring non-energy-constrained device may coordinate different long timeslot schedules which overlap in time. This way, the energy-constrained device 505 may benefit from frequency diversity at a given point in time.

Although not shown in FIG. 5, the non-energy-constrained device 515 may be selected by a centralized management device, e.g., Network Management Server (NMS), Field Area Router (FAR), etc., to adopt the long timeslot schedule. The centralized management device may utilize device type and topology information, for example, to prioritize non-energy-constrained devices which are within proximity of energy-constrained devices.

After a long timeslot schedule is overlaid on the frequency-hopping schedule of the non-energy-constrained device 515, the device may propagate the long timeslot schedule to neighboring devices 520 and 525. Because the non-energy-constrained device 515 interrupts its short timeslot schedule with the long timeslot schedule in order to receive a data message 510 from the energy-constrained device 505, the non-energy-constrained device must notify other neighboring devices to avoid losing connectivity. The non-energy-constrained device 515 may notify neighboring devices 520 and 525 by including the long timeslot schedule information in all packets transmitted by the device, i.e., data and acknowledgment packets. Alternatively, the long timeslot schedule information may only be included in a transmitted packet when the start of a long timeslot is near, which relies on the fact that neighboring non-energy-constrained devices must periodically re-synchronize.

Upon being notified of an upcoming long timeslot schedule from the non-energy constrained device 515, the neighboring devices 520 and 525 may respond in various ways. For instance, the neighboring devices may continue to communicate during the long timeslot by simply transmitting on the proper channel. In the alternative, the neighboring devices may avoid communicating to the non-energy constrained device 515 during the long timeslot, effectively prioritizing transmissions from the energy-constrained device 505. In yet another alternative, the neighboring devices may communicate only select traffic, e.g., high priority traffic.

Figure 6:
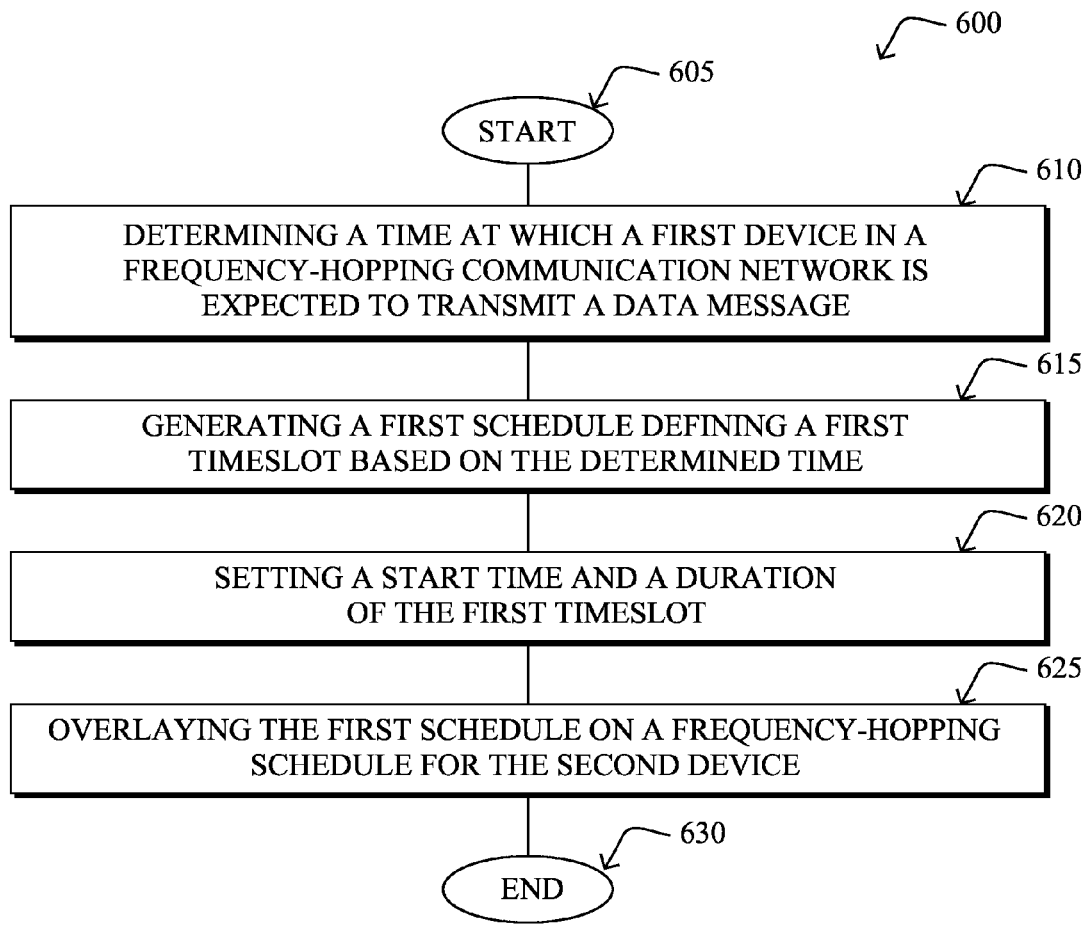
FIG. 6 illustrates an exemplary simplified procedure for overlaying receive schedules in a frequency-hopping communication network.

FIG. 6 illustrates an exemplary simplified procedure 600 for overlaying receive schedules in a frequency-hopping communication network. As shown in FIG. 6, the procedure 600 may start at step 605, continue to step 610, and so forth, where, as described in greater detail above, an energy-constrained receive schedule is overlaid on a frequency-hopping schedule. Although FIG. 6 depicts steps in a particular order, it should be understood that the depicted embodiment is not limiting, and the particular order, as well as the selected steps, are depicted merely for illustration purposes.

At Step, 610, the procedure 600 includes determining a time at which a first device in a frequency-hopping communication network is expected to transmit a data message. As described above, the first device may be an energy-constrained device.

At Step 615, the procedure 600 further includes generating a first schedule based on the determined time. The first schedule defines a first timeslot during which a second device in the network listens for the data message. As described above, the first schedule may be an energy-constrained device schedule, and the first timeslot may be a long timeslot. Additionally, the second device may be a non-energy-constrained device, or another energy-constrained device.

At Step 620, the procedure further includes setting a start time and a duration of the first timeslot. The start time and duration of the first timeslot may be set in a number of ways. For instance, the energy-constrained device, i.e., first device, may explicitly schedule the start time and duration of the long timeslot. The energy-constrained device is likely to know when it needs to communicate next, as well as the expected synchronization error given the properties of the local oscillator. In the alternative, the non-energy-constrained device, i.e., second device, may explicitly schedule the start time and duration of the long timeslot. The non-energy-constrained device may be communicating with multiple energy-constrained devices at a time and may wish to avoid contention between them. In yet another alternative, a hybrid approach may be adopted, in which the energy-constrained device transmits a request with a range of start times, and the non-energy-constrained device replies to the request by scheduling a long timeslot in the specified range.

In addition to the start time and duration of the long timeslot, the frequency used for transmission by the energy-constrained device during the long timeslot may be established during this step. For instance, the frequency may be selected using a pseudorandom function based on the long timeslot's start time and a unique identifier, e.g., EUI-64, of the transmitter or receiver. Alternatively, the frequency may be explicitly communicated by the energy-constrained device or non-energy-constrained device as part of the scheduling process.

At Step 625, the procedure further includes overlaying the first schedule on a frequency-hopping schedule for the second device. As described in detail above, overlaying the energy-constrained device schedule with occasional long timeslots on the existing frequency-hopping schedule allows the non-energy-constrained device to deal with different expected synchronization errors between peers.

It should be understood that the steps shown in FIG. 6 are merely examples for illustration, and certain steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for overlaying receive schedules in frequency-hopping networks. The disclosed embodiments address the need to support energy-constrained devices, e.g., gas meters, water meters, etc., that only communicate once every so often (e.g., 8-24 hours). By overlaying long timeslots on top of the existing short timeslot schedule, the embodiments maintain the advantages of interference robustness and channel diversity provided by the short timeslot schedule, while the long timeslots allow for energy-constrained devices to transmit messages in a frequency-hopping system even with large synchronization errors. Because the energy-constrained devices do not communicate often, the side effects of overlaid long timeslots on the rest of the network traffic is minimal.

While there have been shown and described illustrative embodiments that provide for overlaying receive schedules in frequency-hopping networks, it is to be understood that various other adaptations and modifications may be made within the spirit and scope of the embodiments herein. For example, the embodiments have been shown and described herein primarily with relation to LLNs. However, the embodiments in their broader sense are not as limited, and may, in fact, be used with other types of networks and/or protocols.

Moreover, the foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a network, e.g., an LLN, a processor coupled to the at least one network interface, and a memory configured to store program instructions executable by the processor. Further, it is expressly contemplated that the components and/or elements described herein can be implemented as software being stored on a tangible, non-transitory computer-readable medium (e.g., disks/CDs/RAM/EEPROM/etc.) having program instructions executable by a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:
1. A method, comprising:
 determining a start time at which a first device in a frequency-hopping communication network is expected to transmit a data message;
 generating a first schedule based on the determined start time the first device is expected to transmit the data message, the first schedule defining a first timeslot during which a second device in the network listens for the data message; and
 overlaying the first schedule on a frequency-hopping schedule for the second device, wherein
  the frequency-hopping schedule defines a plurality of second timeslots during which the second device listens for data messages from other devices in the network, a duration of the first timeslot is greater than respective durations of the plurality of second timeslots; and
setting the duration of the first timeslot based on an expected synchronization error of the first device.

2. The method as in claim 1, wherein:
the first device is an energy-constrained device, and
the second device is a non-energy-constrained device.

3. The method as in claim 1, further comprising:
dynamically adjusting the duration of the first timeslot based on an observed synchronization error of the first device.

4. The method as in claim 1, further comprising:
setting the duration of the first timeslot based on a predetermined maximum amount of retransmissions necessary for the second device to receive the data message.

5. The method as in claim 1, wherein the generating of the first schedule further comprises:
receiving, from the first device, the start time and the duration of the first timeslot.

6. The method as in claim 1, wherein the generating of the first schedule further comprises:
setting, by the second device, the start time and the duration of the first timeslot.

7. The method as in claim 6, wherein the generating of the first schedule further comprises:
receiving, at the second device, a message from the first device indicating a range of potential start times, wherein
the start time is set based on the range of potential start times.

8. The method as in claim 1, wherein the first schedule defines a plurality of first timeslots, each of the first timeslots being consecutively arranged with one another.

9. The method as in claim 1, wherein the first schedule repeats after a predetermined period of time.

10. The method as in claim 1, further comprising:
propagating, from the second device, the first schedule to neighboring devices in the network.

11. The method as in claim 1, wherein the second device is selected by a centralized management device.

12. An apparatus, comprising:
one or more network interfaces that communicate with a frequency-hopping communication network as a second device;
a processor coupled to the one or more network interfaces and configured to execute a process; and
a memory configured to store program instructions which contain the process executable by the processor, the process comprising:
determining a start time at which a first device in the network is expected to transmit a data message;
generating a first schedule based on the determined start time the first device is expected to transmit the data message, the first schedule defining a first timeslot during which the second device in the network listens for the data message; and
overlaying the first schedule on a frequency-hopping schedule for the second device,
wherein
the frequency-hopping schedule defines a plurality of second timeslots during which the second device listens for data messages from other devices in the network, a duration of the first timeslot is greater than respective durations of the plurality of second timeslots, and the duration of the first timeslot is set based on an expected synchronization error of the first device.

13. The apparatus as in claim 12, wherein:
the first device is an energy-constrained device, and
the second device is a non-energy-constrained device.

14. The apparatus as in claim 12, the process further comprising:
dynamically adjusting the duration of the first timeslot based on an observed synchronization error of the first device.

15. The apparatus as in claim 12, the process further comprising:
setting the duration of the first timeslot based on a predetermined maximum amount of retransmissions necessary for the second device to receive the data message.

16. The apparatus as in claim 12, wherein the generating of the first schedule further comprises:
receiving, from the first device, the start time and the duration of the first timeslot.

17. The apparatus as in claim 12, wherein the generating of the first schedule further comprises:
setting, by the second device, the start time and the duration of the first timeslot.

18. A tangible non-transitory computer readable medium storing program instructions that cause a computer to execute a process, the process comprising:
determining a start time at which a first device in a frequency-hopping communication network is expected to transmit a data message;
generating a first schedule based on the determined start time the first device is expected to transmit the data message, the first schedule defining a first timeslot during which a second device in the network listens for the data message;
overlaying the first schedule on a frequency-hopping schedule for the second device, wherein
the frequency-hopping schedule defines a plurality of second timeslots during which the second device listens for data messages from other devices in the network, a duration of the first timeslot is greater than respective durations of the plurality of second timeslots, the duration of the first timeslot is set based on an expected synchronization error of the first device.

* * * * *